(12) United States Patent
Mantha et al.

(10) Patent No.: US 10,886,781 B2
(45) Date of Patent: Jan. 5, 2021

(54) WIRELESS POWER TRANSMITTING CIRCUITRY WITH MULTIPLE MODES

(71) Applicant: Apple Inc., Cupertino, CA (US)

(72) Inventors: Soumya Mantha, San Jose, CA (US); Manjit S. Walia, San Jose, CA (US); Rahul A. Sabnani, Colma, CA (US); Yiling Xu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 15/997,508

(22) Filed: Jun. 4, 2018

(65) Prior Publication Data

US 2019/0305595 A1 Oct. 3, 2019

Related U.S. Application Data

(60) Provisional application No. 62/652,124, filed on Apr. 3, 2018.

(51) Int. Cl.
*H02J 50/12* (2016.01)
*H02M 7/537* (2006.01)
*H01F 38/14* (2006.01)
*H02J 7/02* (2016.01)

(52) U.S. Cl.
CPC .............. *H02J 50/12* (2016.02); *H01F 38/14* (2013.01); *H02J 7/025* (2013.01); *H02M 7/537* (2013.01)

(58) Field of Classification Search
CPC .. H02J 50/12; H02J 50/80; H02J 50/60; H02J 50/90; H02J 50/10; H02J 7/02; H02J 7/025; H01F 38/14; H02M 7/537
USPC ................. 307/104, 149, 66, 64, 43, 9.1, 11
See application file for complete search history.

(56) References Cited

U.S. PATENT DOCUMENTS 9,842,684 B2 * 12/2017 John .................... H04B 5/0075
9,985,442 B2    5/2018 Von Novak, III et al.
10,141,788 B2 * 11/2018 Karnstedt ............... H02J 50/90
(Continued)

OTHER PUBLICATIONS

Riehl, Patrick S., et al., "Wireless power systems for mobile devices supporting inductive and resonant operating modes". IEEE Transactions on Microwave Theory and Techniques 63.3 (2015): 780-790.

*Primary Examiner* — Rexford N Barnie
*Assistant Examiner* — Jagdeep S Dhillon
(74) *Attorney, Agent, or Firm* — Treyz Law Group, P.C.; Joseph Guihan; Tianyi He

(57) ABSTRACT

A wireless power transmitting device includes a plurality of coils and respective wireless power transmitting circuitry coupled to each coil. The wireless power transmitting circuitry coupled to each coil may include an inverter and adjustable circuitry that is configured to mitigated radiated emissions in nominally passive coils in the power transmitting device. The wireless power transmitting circuitry coupled to each coil in the wireless power transmitting device may include adjustable circuitry coupled to an inverter output terminal in parallel or in series with the coil. The adjustable circuitry may have a variable capacitance that is controlled based on whether the coil is in an active or passive mode. The capacitance of the adjustable circuitry may be varied in a repeating cycle when the coil is in a passive mode. The adjustable circuitry may include one or more capacitors coupled between the inverter output terminal and ground.

20 Claims, 13 Drawing Sheets

(56) References Cited

U.S. PATENT DOCUMENTS

| | | | |
|---|---|---|---|
| 2010/0264747 A1* | 10/2010 | Hall | B60L 53/51 |
| | | | 307/104 |
| 2011/0062793 A1* | 3/2011 | Azancot | H01F 38/14 |
| | | | 307/116 |
| 2014/0117760 A1 | 5/2014 | Baarman et al. | |
| 2015/0054355 A1* | 2/2015 | Ben-Shalom | G05B 13/0205 |
| | | | 307/104 |
| 2015/0207333 A1* | 7/2015 | Baarman | H02J 50/12 |
| | | | 307/104 |
| 2016/0294227 A1* | 10/2016 | Podkamien | H02J 50/12 |
| 2017/0346343 A1 | 11/2017 | Atasoy et al. | |
| 2017/0353046 A1* | 12/2017 | Chen | H02J 7/0042 |
| 2018/0097406 A1* | 4/2018 | Chen | H02J 50/12 |
| 2018/0233942 A1* | 8/2018 | Qiu | H02J 50/10 |
| 2018/0233954 A1* | 8/2018 | Yang | H02J 50/40 |
| 2018/0233956 A1* | 8/2018 | Moussaoui | H02J 50/80 |
| 2019/0140481 A1* | 5/2019 | Keeling | H02J 50/60 |

* cited by examiner

WIRELESS POWER TRANSMITTING CIRCUITRY WITH MULTIPLE MODES

This application claims the benefit of provisional patent application No. 62/652,124, filed Apr. 3, 2018, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a coil and rectifier circuitry. The coil receives alternating-current wireless power signals from a coil in the wireless charging mat that is overlapped by the coil in the portable electronic device. The rectifier circuitry converts the received signals into direct-current power.

SUMMARY

A wireless power system has a wireless power transmitting device and a wireless power receiving device. The wireless power transmitting device has an array of transmit coils that produce wireless power signals. The wireless power receiving device has a receive coil that receives wireless power signals from the wireless power transmitting device and has a rectifier that produces direct-current power from the received wireless power signals.

The wireless power transmitting device has respective wireless power transmitting circuitry coupled to each coil. Each coil and accompanying wireless power transmitting circuitry may be operable in an active mode in which the coil is used to transmit wireless power signals and a passive mode in which the coil is not used to transmit wireless power signals. The wireless power transmitting circuitry coupled to each coil may include adjustable circuitry that is configured to mitigated radiated emissions in nominally passive coils in the power transmitting device.

The wireless power transmitting circuitry coupled to each coil in the wireless power transmitting device may include adjustable circuitry coupled to an inverter output terminal in parallel with the coil. The adjustable circuitry may have a variable capacitance that is controlled based on whether the coil is in an active or passive mode. The adjustable circuitry may include one or more capacitors coupled between the inverter output terminal and ground. The capacitance of the adjustable circuitry may be varied in a repeating cycle when the coil is in a passive mode.

The wireless power transmitting circuitry coupled to each coil in the wireless power transmitting device may include adjustable circuitry coupled to an inverter output terminal in series with the coil. The adjustable circuitry may have a variable capacitance that is controlled based on whether the coil is in an active or passive mode. The adjustable circuitry may include one or more capacitors coupled between the coil and ground.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

Figure 1:
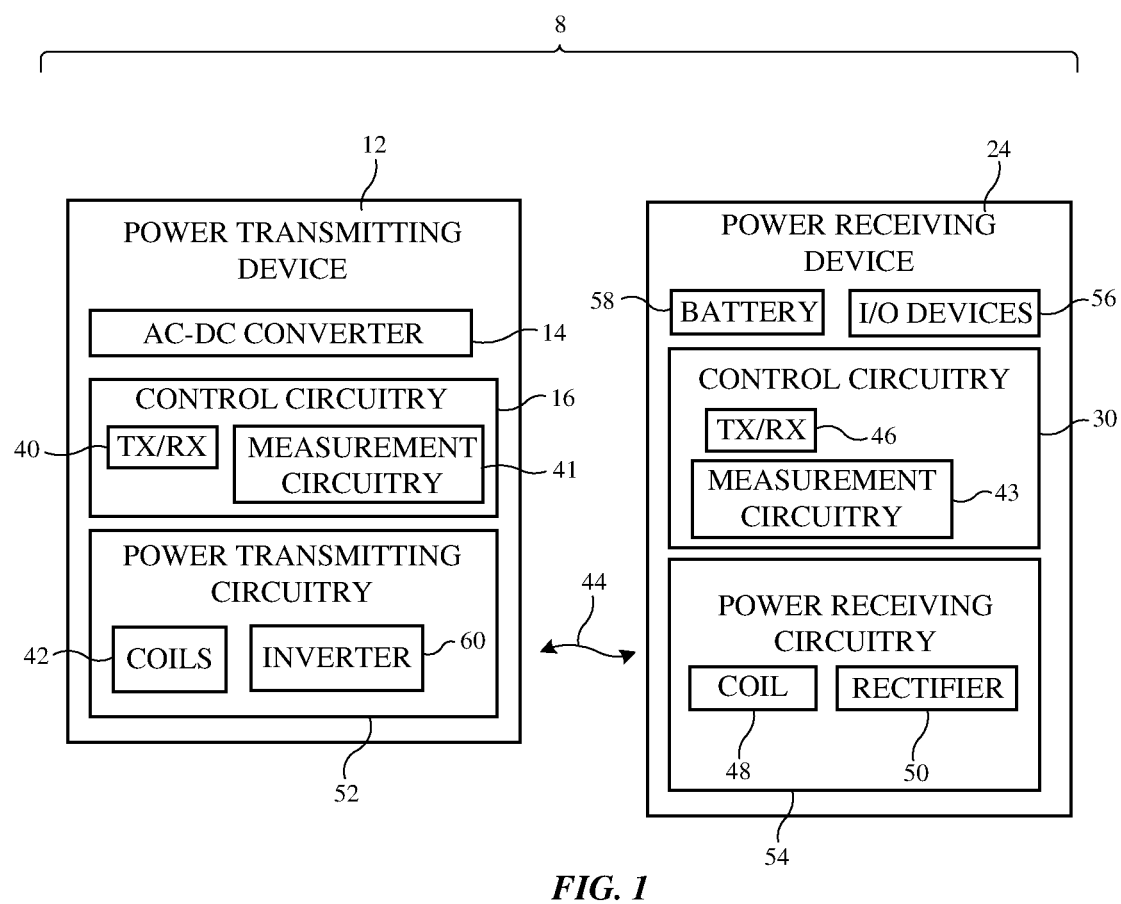
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, a case for an accessory, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42 (e.g., each coil may have respective power transmitting circuitry). Coils 42 may be arranged in a planar coil array (e.g., in configurations in which device 12 is a wireless charging mat).

As the AC currents pass through one or more coils 42, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 may be used in powering a battery such as battery 58 and may be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 may also use one or more coils 42 to transmit in-band signals that are received by wireless transceiver circuitry 46 using coil 48. Similarly, wireless transceiver circuitry 46 may use one or more coils 48 to transmit in-band signals that are received by wireless transceiver circuitry 40 using coil 42. Any suitable modulation scheme may be used to support in-band communications between device 12 and device 24.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, between 100 kHz and 200 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

In some cases, wireless transceiver circuitry 40 in power transmitting device 12 and wireless transceiver circuitry 46 in power receiving device 24 may communicate in-band by modulating the AC drive signals that are used to transfer power. Frequency shift keying (FSK), amplitude shift keying (ASK), or any other desired modulation of the AC drive signals may be used to convey in-band data between device 12 and device 24 (e.g., while power is conveyed wirelessly from device 12 to device 24). Wireless transceiver circuitry 40 and wireless transceiver circuitry 46 may also be configured to inject one or more data carrier waves (that have a different frequency than the AC drive signals) to the AC drive signals used for wireless power transfer. The data carrier waves may be transmitted between devices 12 and 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24.

During object detection and characterization operations, external object measurement circuitry 41 can be used to make measurements on coils 42 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry in control circuitry 30 and/or in control circuitry 16 may also be used in making current and voltage measurements.

The characteristics of each coil 42 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 42. Signal measurement circuitry 41 is configured to apply signals to the coil and measure corresponding signal responses. For example, signal measurement circuitry 41 may apply an alternating-current probe signal while monitoring a resulting signal at a node coupled to the coil. As another example, signal measurement circuitry 41 may apply a pulse to the coil and measure a resulting impulse response (e.g., to measure coil inductance). Using measurements from measurement circuitry 41, the wireless power transmitting device can determine whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

Control circuitry 30 has measurement circuitry 43. In an illustrative arrangement, measurement circuitry 43 of control circuitry 30 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, device 24 may use measurement circuitry 43 to make measurements to characterize device 24 and the components of device 24. For example, device 24 may use measurement circuitry 43 to measure the inductance of coil 48 (e.g., signal measurement circuitry 43 may be configured to measure signals at coil 48 while supplying coil 48 with signals at one or more frequencies to measure coil inductances), provide signal pulses (e.g., so that impulse response measurement circuitry in the measurement circuitry can be used to make inductance and Q factor measurements), etc. Measurement circuitry 43 may also make measurements of the output voltage of rectifier 50, the output current of rectifier 50, etc.

Figure 2:
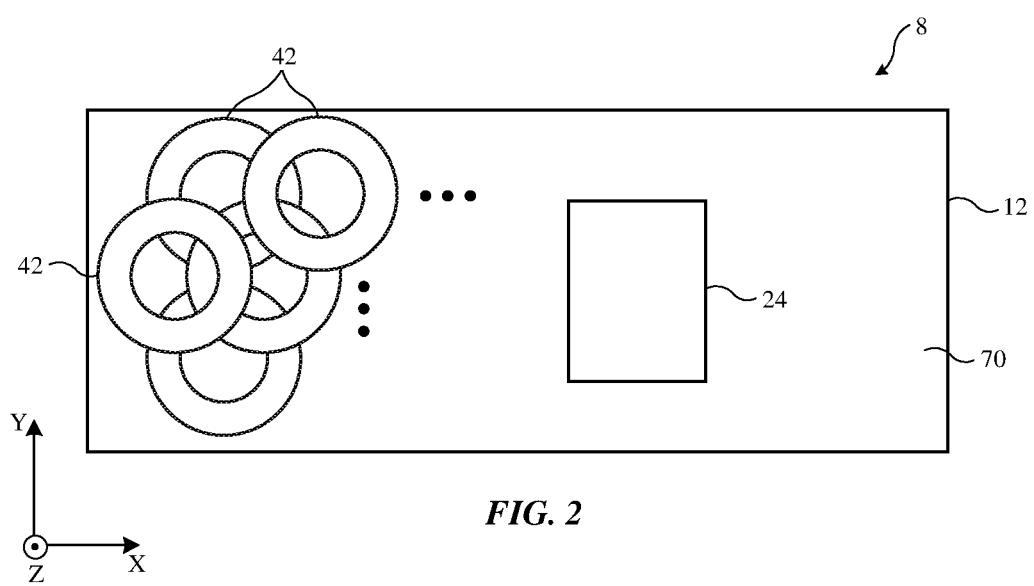
FIG. 2 is a top view of an illustrative wireless power transmitting device having a charging surface on which a wireless power receiving device has been placed in accordance with an embodiment.

A top view of an illustrative configuration for device 12 in which device 12 has an array of coils 42 is shown in FIG. 2. Device 12 may, in general, have any suitable number of coils 42 (e.g., 22 coils, at least 5 coils, at least 10 coils, at least 15 coils, fewer than 30 coils, fewer than 50 coils, etc.). Coils 42 of device 12 may be covered by a planar dielectric structure such as a plastic member or other structure forming charging surface 70. The lateral dimensions (X and Y dimensions) of the array of coils 42 in device 12 may be 1-1000 cm, 5-50 cm, more than 5 cm, more than 20 cm, less than 200 cm, less than 75 cm, or other suitable size. Coils 42 may overlap or may be arranged in a non-overlapping configuration. In a non-overlapping configuration, the coils may be arranged in a single layer (e.g., in a plane parallel to the XY-plane) such that no part of any coil overlaps any of the other coils in the layer. Alternatively, in an overlapping arrangement (as shown in FIG. 2), coils 42 may be organized in multiple layers. Within each layer, the coils do not overlap. However, coils in one layer may overlap coils in one or more other layers (e.g., when viewed from above the outline of a given coil in a given layer may intersect the outline of a coil in another layer). In one illustrative example, the device may have three layers of coils (e.g., a lower layer having eight coils, a middle layer having seven coils, and an upper layer having seven coils). In general, each layer may have any suitable number of coils (e.g., at least 2 coils, at least 5 coils, fewer than 9 coils, fewer than 14 coils, 6-9 coils, etc.). Device 12 may have one layer of coils, at least two layers of coils, at least three layers of coils, at least four layers of coils, fewer than five layers of coils, 4-6 layers of coils, etc. Coils 42 can be placed in a rectangular array having rows and columns and/or may be tiled using a hexagonal tile pattern or other pattern.

System 8 may be configured to accommodate the simultaneous charging of multiple devices 24. However, illustrative operations involved in operating system 8 to provide power wirelessly to a single device 24 are described herein as an example. A user of system 8 may place wireless power receiving devices such as device 24 of FIG. 2 on device 12 for charging. Magnetic coupling coefficient k represents the amount of magnetic coupling between transmitting and receiving coils in system 8. Wireless power transfer efficiency scales with k, so optimum charging (e.g., peak efficiency) may be obtained by evaluating the coupling coefficient k for each coil and choosing appropriate coil(s) to use in transmitting wireless power to device 24 based on the coupling coefficients.

Figure 3:
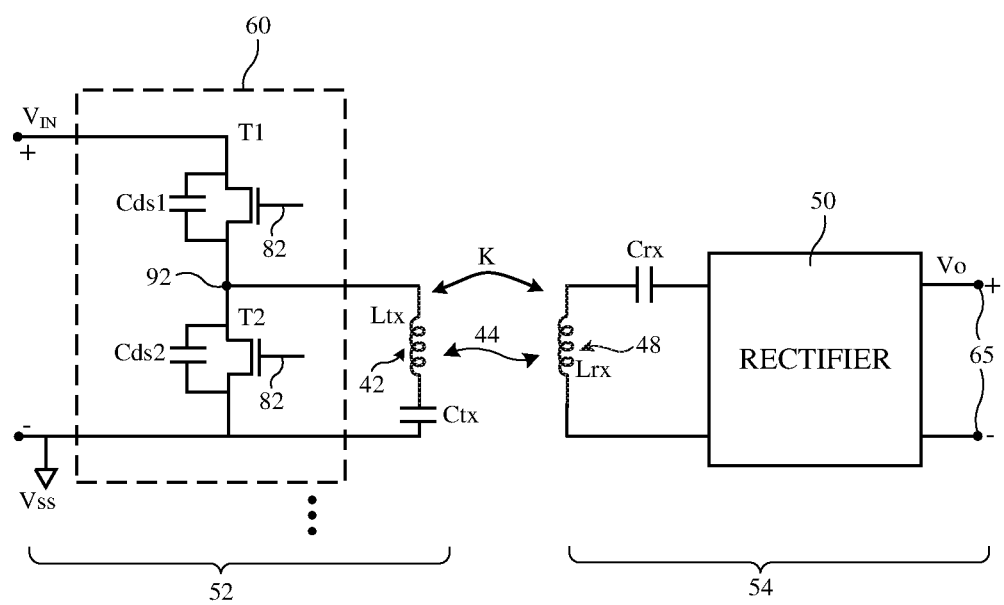
FIG. 3 is a circuit diagram of illustrative wireless power transmitting circuitry and wireless power receiving circuitry in accordance with an embodiment.

Illustrative circuitry of the type that may be used for forming power transmitting circuitry 52 and power receiving circuitry 54 of FIG. 1 is shown in FIG. 3. As shown in FIG. 3, power transmitting circuitry 52 may receive a DC voltage Vin (e.g., from AC-DC converter 14 shown in FIG. 1). Control circuitry 16 (FIG. 1) may produce control signals that are applied to gate terminals 82 of transistors T1 and T2 of inverter 60. With one illustrative configuration, the inverter circuitry includes multiple inverter circuits such as inverter 60 of FIG. 3 each of which is controlled by control circuitry 16 of device 12 and each of which is coupled to a respective one of coils 42. After coupling coefficients k have been determined for each coil 42, control circuitry 16 can switch appropriate coil(s) 42 into use by selecting corresponding inverters 60 to use in driving signals into the coils.

Gates 82 of transistors T1 and T2 may receive complementary signals so that the gate of T1 is high when the gate of T2 is low and vice versa. With one illustrative configuration, transistors T1 and T2 may be supplied with an AC signal at 200 kHz or other suitable frequency that is modulated with a PWM envelope at 2 kHz or other suitable PWM frequency. Other suitable control signals may be applied to T1 and T2, if desired. Transistors T1 and T2 may be characterized by an internal diode and drain-source capacitance (see, e.g., capacitances Cds1 and Cds2), as shown schematically in FIG. 3. Transistors T1 and T2 may be metal-oxide-semiconductor transistors or other suitable transistors.

Transistors T1 and T2 are coupled in series between a positive voltage terminal (at power supply voltage Vin) and a ground power supply terminal (at ground voltage Vss). Coil 42 has a first terminal coupled to an output terminal 92 between transistors T1 and T2 and a second terminal coupled to ground via capacitor Ctx. As the control signals are applied to gates 82 of output transistors T1 and T2, the DC voltage Vin is converted into an AC current that passes through capacitor Ctx and coil 42 (having a self-inductance of Ltx). This produces corresponding electromagnetic signals 44 (magnetic fields), which are electromagnetically coupled into coil 48 in wireless power receiving circuitry 54. In general, coil 42 in FIG. 3 may represent one or more wireless power transmitting coils in device 12, optionally arranged in an array as shown in FIG. 2. Similarly, coil 48 in FIG. 3 may represent one or more wireless power receiving coils in device 24.

The degree of electromagnetic (magnetic) coupling between coils 42 and 48 is represented by magnetic coupling coefficient k. Signals 44 are received by coil 48 (having a self-inductance of Lrx). Coil 48 and capacitor Crx are connected to rectifier 50. During operation, the AC signals from coil 48 that are produced in response to received signals 44 are rectified by rectifier 50 to produce direct-current output power (e.g., direct-current rectifier output voltage Vo) across output terminals 65. Terminals 65 are connected to and provide power to the load of power receiving device 24 (e.g., battery 58 and other components in device 24 that are being powered by the direct-current power supplied from rectifier 50).

As previously discussed, control circuitry 16 can switch appropriate coil(s) 42 into use by selecting corresponding inverters 60 to use in driving signals at the power transmission frequency into the coils. The coils that are switched into use by the control circuitry 16 (and therefore transmit wireless power signals) may be referred to as active coils. Coils that are not used to transmit wireless power signals may be referred to as passive (or inactive) coils. Control circuitry 16 may disable the inverters that are associated with passive coils, for example. Controlling whether a coil is active or passive may be important to operation of wireless power transmission device 12. Active coils may be specifically selected to prevent wireless power signals from being delivered to incompatible electronic devices or foreign objects, for example. Additionally, active coils may be selected to meet radiated emission limits for the wireless power transmitting device. Therefore, it is desirable for the coils that are nominally passive to actually be passive.

However, in a power transmitting device with multiple coils (e.g., as shown in FIG. 2), magnetic coupling and leakage from the active coils to the passive coils may cause the nominally passive coils to have high levels of radiated emissions (i.e., unintentional release of electromagnetic energy). Magnetic coupling and leakage from the active coils to the passive coils may occur at both the fundamental frequency (e.g., the power transmission frequency) and at harmonic frequencies of the fundamental frequency. Power transmission circuitry 52 of power transmitting device 12 may therefore include circuitry to mitigate radiated emissions in nominally passive coils in the power transmitting device.

Figure 4:
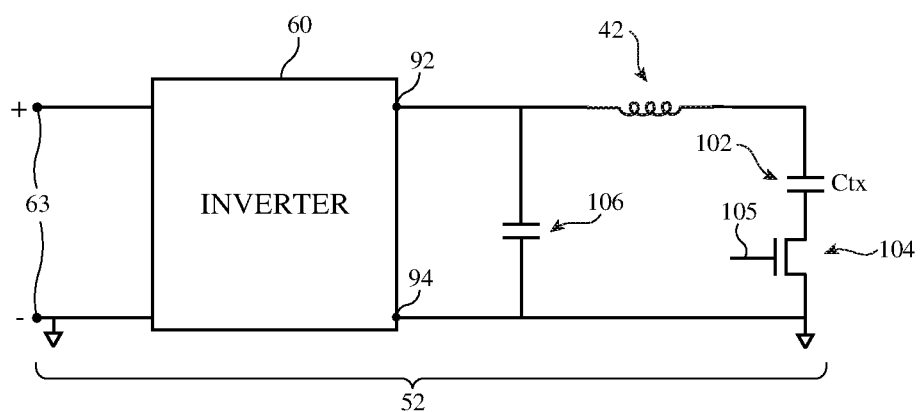
FIG. 4 is a circuit diagram of illustrative wireless power transmitting circuitry with a filtering capacitor coupled in parallel with a coil in accordance with an embodiment.

Illustrative circuitry of the type that may be used for forming power transmitting circuitry 52 is shown in FIG. 4.

Each coil 42 may have respective power transmitting circuitry (sometimes referred to as a respective power transmitting circuit). The circuitry of FIG. 4 has an inverter 60 with direct-current power supply input terminals 63, output terminal 92, and ground terminal 94. As previously discussed coil 42 may be coupled in series with capacitor 102 (Ctx) between inverter output terminal 92 and ground (e.g., ground terminal 94). As shown in FIG. 4, transistor 104 may also be coupled in series with coil 42 and capacitor 102. Control circuitry 16 (FIG. 1) may produce control signals that are applied to gate terminal 105 of transistor 104. Transistor 104 may be asserted when power transmitting circuitry 52 is being used to transmit wireless power (e.g., coil 42 is active) and may be deasserted when power transmitting circuitry 52 is not being used to transmit wireless power (e.g., coil 42 is passive or inactive). Transistor 104 may be used to mitigate leakage at the fundamental frequency from active coils to passive coils in wireless power transmitting device 12. This will be discussed in greater detail later (in connection with FIG. 9). First, mitigating leakage due to cross-coupling of harmonics will be discussed.

As shown in FIG. 4, wireless power transmitting circuitry may include a capacitor 106 that is coupled between output terminal 92 of inverter 60 and ground. Capacitor 106 may be a low-pass filter that filters out high frequencies. For example, capacitor 106 may filter signals having a frequency greater than 30 MHz (or any other desired frequency). Capacitor 106 may be coupled in parallel with coil 42, capacitor 102, and transistor 104 (e.g., between inverter output terminal 92 and ground). Although capacitor 106 may be useful in filtering out high frequency signals from wireless power transmission circuitry 52, capacitor 106 may cause unintentional resonance in the circuitry at harmonic frequencies (e.g., at the fifth harmonic).

Figure 5:
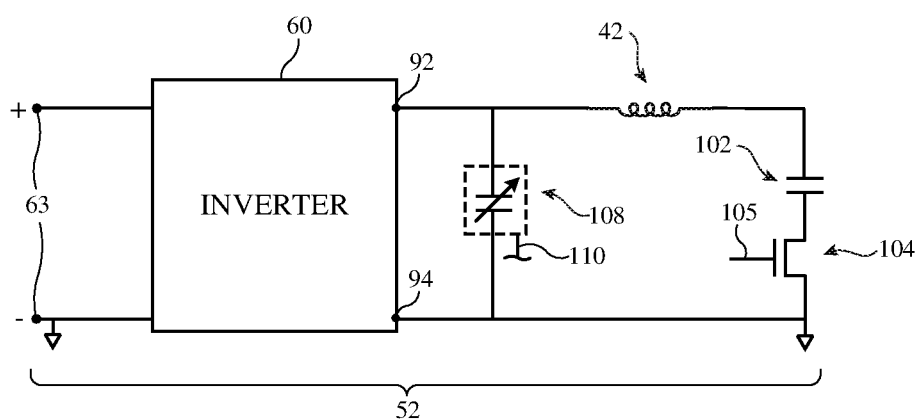
FIG. 5 is a circuit diagram of illustrative wireless power transmitting circuitry with variable capacitance circuitry coupled in parallel with a coil in accordance with an embodiment.

To reduce radiated emissions caused by capacitor 106, wireless power transmitting circuitry may instead include adjustable circuitry having a variable capacitance coupled in parallel with coil 42, capacitor 102, and transistor 104. An arrangement of this type is shown in FIG. 5. As shown in FIG. 5, adjustable circuitry 108 (sometimes referred to as adjustable capacitance circuitry or variable capacitance circuitry) is coupled between output terminal 92 of inverter 60 and ground. Adjustable circuitry 108 may include any desired components that allow the capacitance coupled to output terminal 92 to be changed. For example, adjustable circuitry 108 may include one or more fixed capacitors, one or more variable capacitors, one or more switches (e.g., that switch fixed capacitors or variable capacitors into or out of the circuit), one or more bias voltage supply lines, etc.

When a particular coil 42 is passive, the adjustable circuitry 108 in the wireless power transmitting circuitry of that coil may be dynamically changed to reduce the voltage induced into the coil at harmonic frequencies. For example, the adjustable circuitry 108 may vary between a minimum capacitance value and a maximum capacitance value with any desired number of intervening capacitances (evenly spaced or unevenly spaced). The minimum capacitance value may be below 10 nanofarads (nF), below 6 nanofarads, below 4 nanofarads, between 3 and 5 nanofarads, between 2 and 6 nanofarads, between 5 and 7 nanofarads, between 2 and 8 nanofarads, below 1 nanofarads, below 0.1 nanofarad, below 0.01 nanofarads, below 100 nanofarads, below 1000 nanofarads, greater than 10 nanofarads (nF), greater than 6 nanofarads, greater than 4 nanofarads, greater than 1 nanofarads, greater than 0.1 nanofarads, greater than 0.01 nanofarads, greater than 100 nanofarads, greater than 1000 nanofarads, etc. The maximum capacitance value may be below 10 nanofarads (nF), below 6 nanofarads, below 4 nanofarads, between 8 and 12 nanofarads, between 9 and 11 nanofarads, between 5 and 15 nanofarads, between 7 and 10 nanofarads, below 1 nanofarads, below 0.1 nanofarads, below 0.01 nanofarads, below 100 nanofarads, below 1000 nanofarads, greater than 10 nanofarads (nF), greater than 6 nanofarads, greater than 4 nanofarads, greater than 1 nanofarad, greater than 0.1 nanofarads, greater than 0.01 nanofarads, greater than 100 nanofarads, greater than 1000 nanofarads, etc.

The length of time the capacitance of adjustable circuitry 108 remains constant (before being changed to a different capacitance) may be any desired time interval. For example, the time interval may be less than 10 seconds, less than 1 second, less than 0.1 seconds, less than 0.01 seconds, less than 1 millisecond, less than 0.1 milliseconds, less 0.01 milliseconds, greater than 10 seconds, greater than 1 second, greater than 0.1 seconds, greater than 0.01 seconds, greater than 1 millisecond, greater than 0.1 milliseconds, less 0.01 milliseconds etc. The time interval may be fixed or may vary.

Adjustable circuitry 108 may consistently cycle through any desired number of capacitances. For example, adjustable circuitry 108 may have two, more than four, more than eight, more than twelve, more than sixteen, sixteen, more than twenty, less than four, less than eight, less than twelve, less than sixteen, or less than twenty different states (each with a corresponding unique capacitance). The components of adjustable circuitry 108 may receive control signal(s) 110 (e.g., from control circuitry 16) that place the components into a desired state with a corresponding desired capacitance. The capacitance of adjustable circuitry 108 may be varied in a repeating cycle or in any other desired way. When coil 42 is active, adjustable circuitry 108 may be fixed (e.g., may remain in a single state with a single corresponding capacitance) or may be varied (e.g., in the same manner as when coil 42 is passive or in a different manner as when coil 42 is passive). If desired, when coil 42 is passive, control circuitry 16 may set adjustable circuitry 108 to a fixed capacitance value (instead of cycling through different capacitances). For example, based on the position of the passive coil relative to the active coils in the power transmitting device, the control circuitry may select a capacitance for adjustable circuitry 108 that minimizes radiated emissions.

Figure 6:
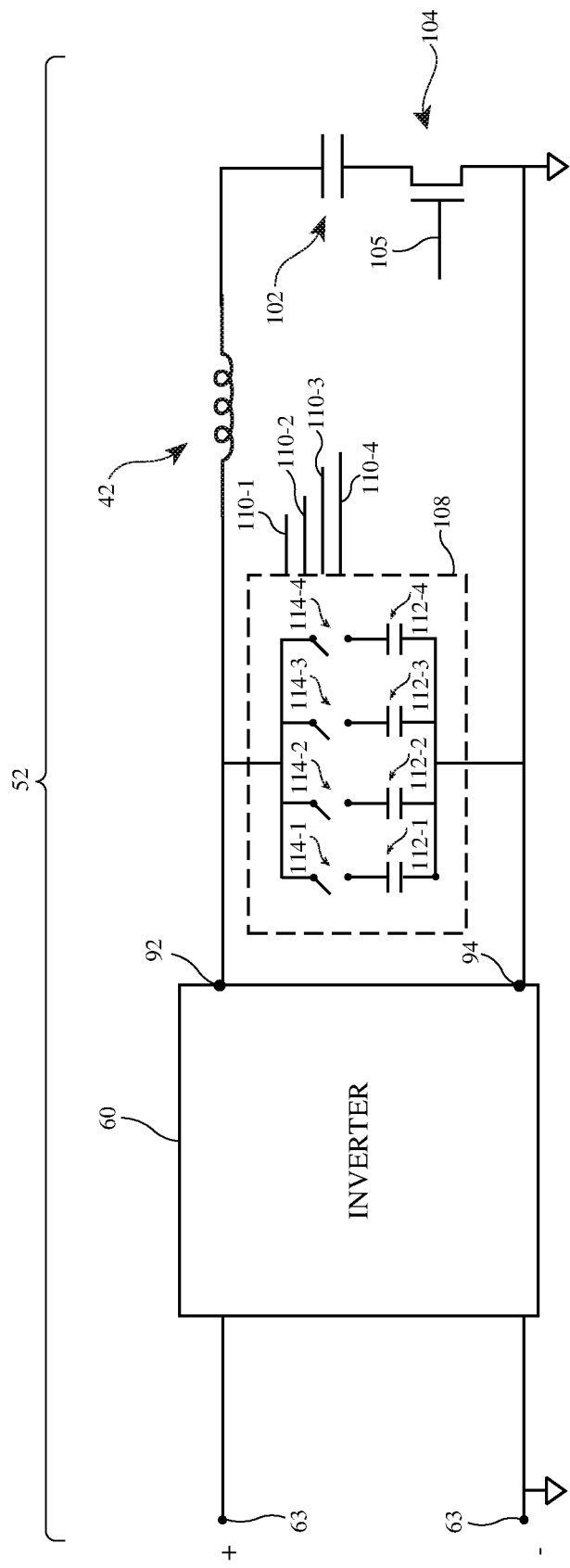
FIG. 6 is a circuit diagram of illustrative wireless power transmitting circuitry with variable capacitance circuitry including fixed capacitors and switches coupled in parallel with a coil in accordance with an embodiment.
Figure 7:
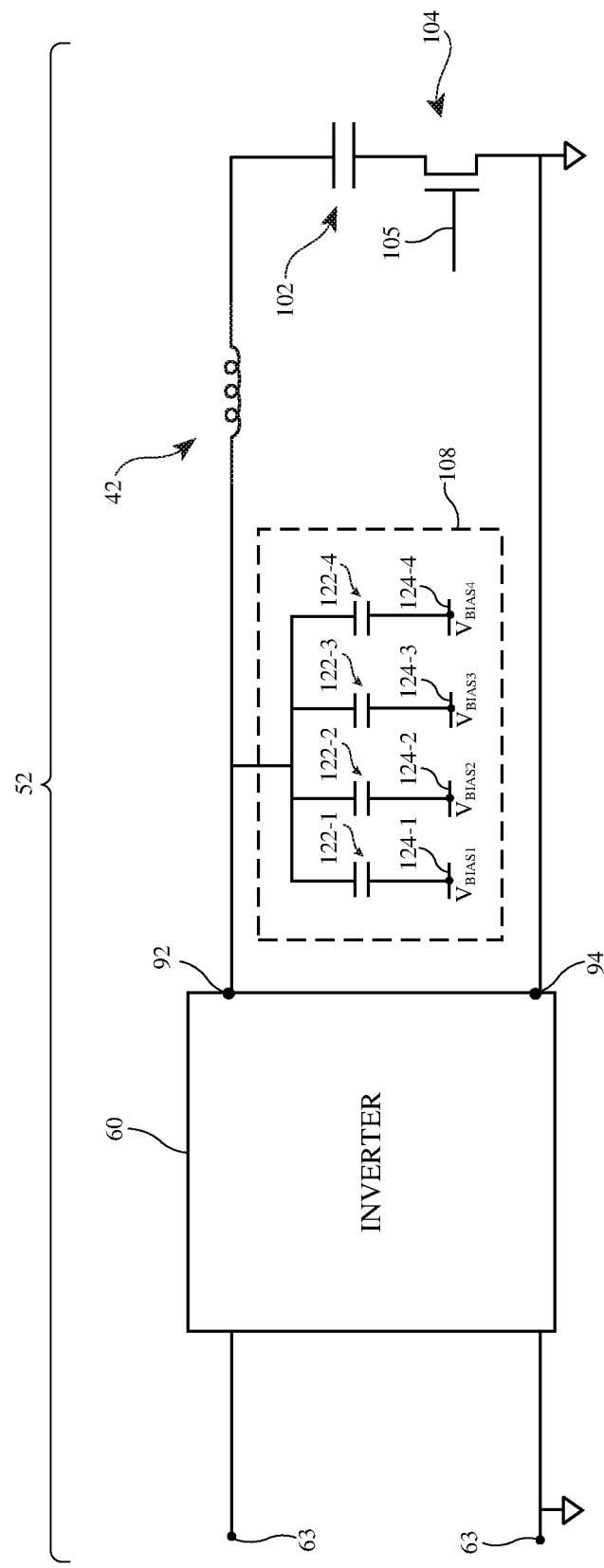
FIG. 7 is a circuit diagram of illustrative wireless power transmitting circuitry with variable capacitance circuitry including fixed capacitors coupled to bias voltage supply lines coupled in parallel with a coil in accordance with an embodiment.

FIGS. 6 and 7 show examples of components that may be used to implement variable capacitance circuitry 108. As shown in FIG. 6, variable capacitance circuitry 108 may include a plurality of fixed capacitors that are enabled or disabled using corresponding switches. Capacitor 112-1 and switch 114-1 are coupled in series between inverter output terminal 92 and ground. Capacitor 112-2 and switch 114-2 are coupled in series between inverter output terminal 92 and ground. Capacitor 112-3 and switch 114-3 are coupled in series between inverter output terminal 92 and ground. Capacitor 112-4 and switch 114-4 are coupled in series between inverter output terminal 92 and ground. Capacitors 112-1, 112-2, 112-3, and 112-4 (and their corresponding switches) are all connected in parallel (between output terminal 92 and ground).

Each switch may receive a corresponding control signal (e.g., from control circuitry 16) that is used to connect (e.g., enable) or disconnect (e.g., disable) the associated capacitor. Switch 114-1 receives control signal 110-1, switch 114-2 receives control signal 110-2, switch 114-3 receives control signal 110-3, and switch 114-4 receives control signal 110-4.

Connecting and disconnecting different subsets of the capacitors will change the effective capacitance of variable capacitance circuitry 108. In FIG. 6, variable capacitance circuitry 108 may be referred to as a capacitor bank (e.g., a 4-bit digital capacitor bank). The example of the capacitor bank in FIG. 6 including four capacitors is merely illustrative. Any desired number of capacitors may be included in the capacitor bank of FIG. 6.

In another example, shown in FIG. 7, adjustable circuitry 108 may include a plurality of fixed capacitors that are coupled to respective bias voltage supply lines. Capacitor 122-1 is coupled between inverter output terminal 92 and bias voltage supply line 124-1. Capacitor 122-2 is coupled between inverter output terminal 92 and bias voltage supply line 124-2. Capacitor 122-3 is coupled between inverter output terminal 92 and bias voltage supply line 124-3. Capacitor 122-4 is coupled between inverter output terminal 92 and bias voltage supply line 124-4. Each bias voltage supply line provides a respective bias voltage (e.g., using control circuitry 16). Bias voltage supply line 124-1 provides bias voltage $V_{BIAS1}$, bias voltage supply line 124-2 provides bias voltage $V_{BIAS2}$, bias voltage supply line 124-3 provides bias voltage $V_{BIAS3}$, and bias voltage supply line 124-4 provides bias voltage $V_{BIAS4}$.

The bias voltages supplied by the bias voltage supply lines may be controlled to change the capacitance of adjustable circuitry 108. For example, $V_{BIAS1}$ may be changed from ground to a different bias voltage to change the effective capacitance of capacitor 122-1. In this way, the capacitance may be controlled by the bias voltage supply lines (this technique is sometimes referred to as bottom plate sampling). The example in FIG. 7 of including four capacitors to form adjustable circuitry 108 is merely illustrative. Any desired number of capacitors may be included in the variable capacitance of FIG. 7.

Figure 8:
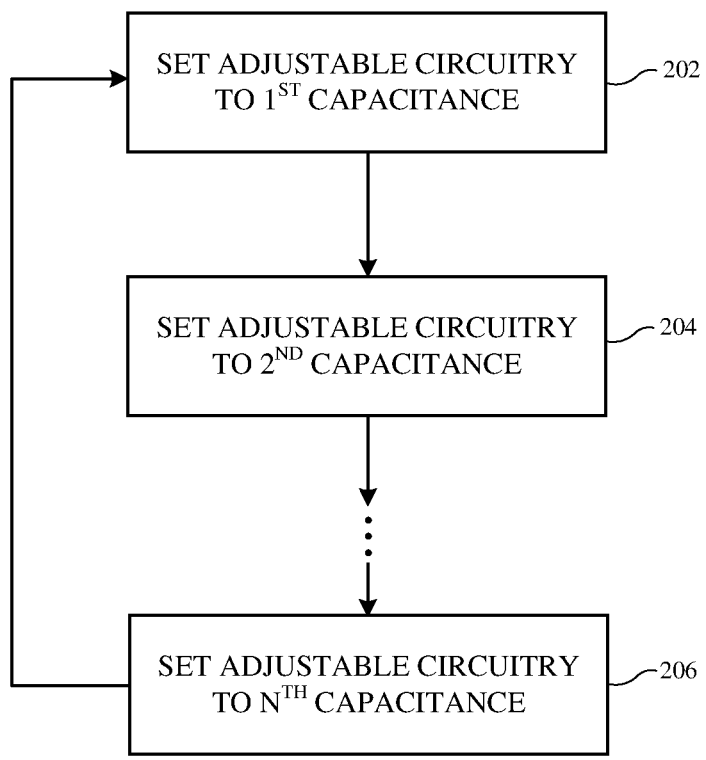
FIG. 8 is a flow chart of illustrative operations involved in operating wireless power transmitting circuitry with variable capacitance circuitry coupled in parallel with a coil in accordance with an embodiment.

FIG. 8 is a flow chart of illustrative operations involved in using wireless power transmitting device 12. In particular, FIG. 8 shows illustrative operations involved in controlling adjustable circuitry 108 in a passive coil (e.g., while the coil is in a passive mode). During the operations of block 202, control circuitry 16 may set adjustable circuitry 108 to a first capacitance for a first length of time. After the first length of time, control circuitry 16 may set adjustable circuitry 108 to a second capacitance that is different than the first capacitance for a second length of time. The first and second lengths of time may be any desired lengths of time (and may be the same or may be different). These steps may repeat for as many capacitance values as desired. At step 206, control circuitry 16 may set adjustable circuitry 108 to an $n^{th}$ capacitance. After progressing through the desired number (n) of capacitances for adjustable circuitry 108, the method may loop back to step 202. This cycle may proceed continuously. Control circuitry 16 may set adjustable circuitry 108 to the various capacitances using any desired techniques (e.g., opening and closing switches as in FIG. 6, controlling bias voltages as in FIG. 7, etc.).

As previously discussed, adjustable circuitry 108 is used to mitigate leakage due to cross-coupling of harmonics. Transistor 104 (in FIGS. 4-7) may be used to mitigate leakage at the fundamental frequency from active coils to passive coils in wireless power transmitting device. Transistor 104 is in series with coil 42 and capacitor 102. Capacitor 102 may have a first terminal coupled to coil 42 and a second terminal coupled to transistor 104. When transistor 104 is asserted, the second terminal of capacitor 102 is coupled to ground. However, there may be magnetic coupling between active and passive coils at the fundamental frequency when transistor 104 is asserted. When transistor 104 is deasserted, the second terminal of capacitor 102 will be floating (e.g., the second terminal is coupled to a floating node), reducing magnetic coupling into coil 42. Therefore, transistor 104 may be asserted when power transmitting circuitry 52 is being used to transmit wireless power (e.g., coil 42 is active) and may be deasserted when power transmitting circuitry 52 is not being used to transmit wireless power (e.g., coil 42 is passive or inactive).

Figure 9:
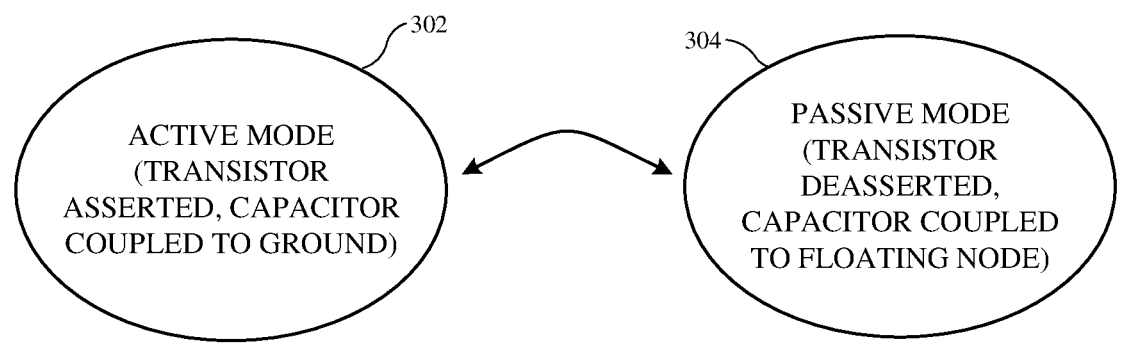
FIG. 9 is a state diagram showing illustrative operating modes for wireless power transmitting circuitry of the type shown in FIGS. 4-7 in accordance with an embodiment.

A state diagram showing illustrative operating modes for wireless power transmitting circuitry 52 of the type shown in FIGS. 4-7 is shown in FIG. 9. As shown, the wireless power transmitting circuitry may be operable in an active mode 302 (e.g., when the wireless power transmitting circuitry is used to transmit wireless power using coil 42). In active mode 302, the wireless power transmitting circuitry may assert transistor 104, coupling capacitor 102 to ground. Also in the active mode, the inverter 60 of the wireless power transmitting circuitry may be used to generate an AC signal at the inverter output terminal. The wireless power transmitting circuitry may also be operable in passive mode 304 (when the wireless power transmitting circuitry is not used to transmit wireless power using coil 42). In passive mode 304 (sometimes referred to as inactive mode 304), the wireless power transmitting circuitry may deassert transistor 104, causing capacitor 102 to be coupled to a floating node. Also in the passive mode, the inverter 60 of the wireless power transmitting circuitry may be disabled.

The example of using a transistor to switch a capacitor between being coupled to ground and being coupled to a floating node to mitigate radiated emissions is merely illustrative. In another embodiment, adjustable circuitry having a variable capacitance may be coupled in series with coil 42. Examples of this type are shown in FIGS. 10-12.

Figure 10:
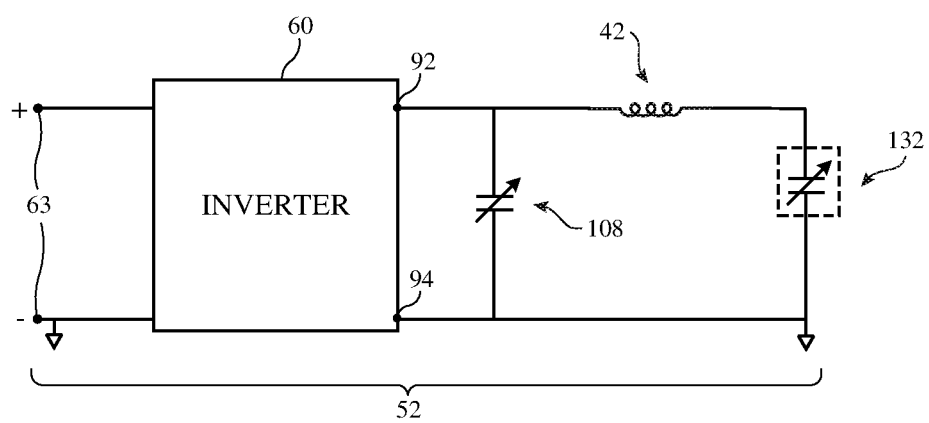
FIG. 10 is a circuit diagram of illustrative wireless power transmitting circuitry with variable capacitance circuitry coupled in series with a coil in accordance with an embodiment.

As shown in FIG. 10, adjustable circuitry 132 (sometimes referred to as adjustable capacitance circuitry or variable capacitance circuitry) may be coupled in series with coil 42 between inverter output terminal 92 and ground. Variable capacitance circuitry 132 and coil 42 may be parallel to adjustable circuitry 108. Variable capacitance circuitry 132 may include any desired components that allow the capacitance coupled in series with coil 42 to be changed. For example, variable capacitance circuitry 132 may include one or more fixed capacitors, one or more variable capacitors, one or more switches (e.g., that switch fixed capacitors or variable capacitors into or out of the circuit), one or more bias voltage supply lines, etc.

When a particular coil 42 is active, the adjustable circuitry 132 in the wireless power transmitting circuitry of that coil may be set to a capacitance that causes the coil to resonate at the fundamental frequency. In contrast, when a particular coil is passive, the adjustable circuitry 132 in the wireless power transmitting circuitry of that coil may be changed to a different capacitance that causes the coil to resonate at a different frequency than the fundamental frequency. Adjustable circuitry 132 may have any desired capacitance in the active mode and in the passive mode.

Figure 11:
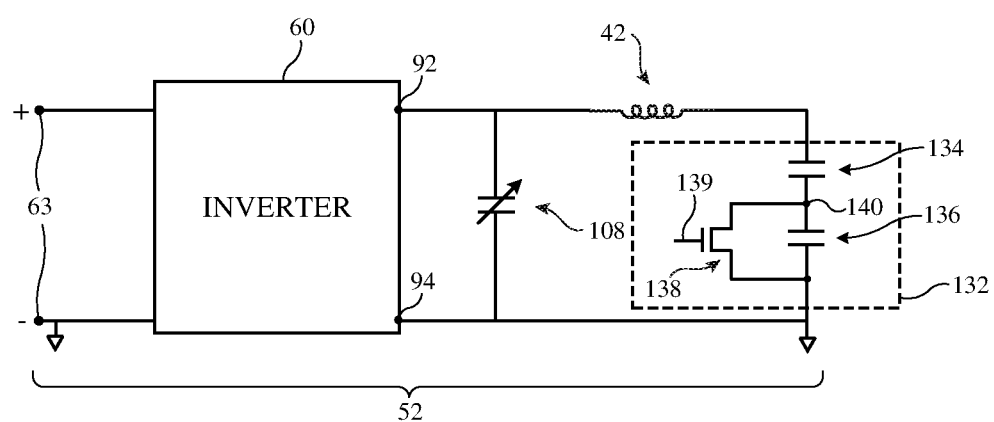
FIGS. 11 and 12 are circuit diagrams of illustrative wireless power transmitting circuitry with variable capacitance circuitry including a transistor and two fixed capacitors coupled in series with a coil in accordance with an embodiment.
Figure 12:
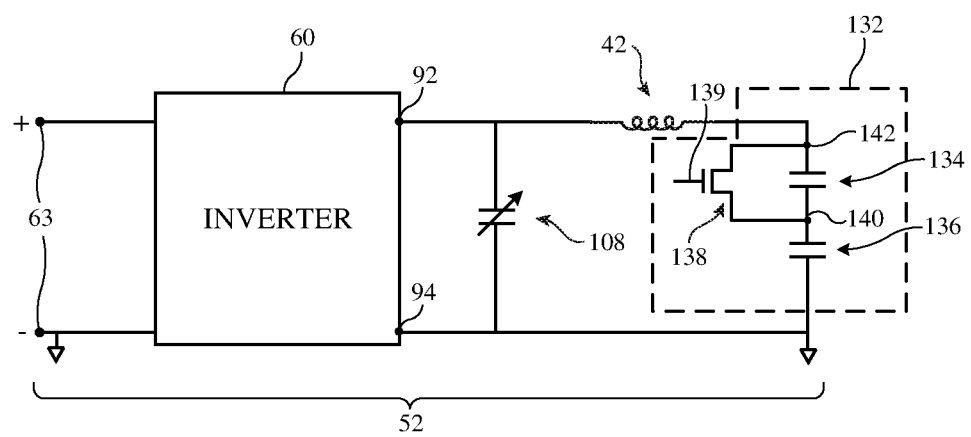

FIGS. 11 and 12 are examples of components that may be used to implement adjustable circuitry 132 in FIG. 10. FIG. 11 shows an example where fixed capacitors 134 and 136 are coupled in series between coil 42 and ground. Additionally, a transistor 138 is coupled between ground and a node 140 that is interposed between capacitors 134 and 136. Control circuitry 16 (FIG. 1) may produce a control signal that is applied to gate terminal 139 of transistor 138. When transistor 138 is asserted, capacitor 136 will be bypassed and capacitor 134 will set the effective capacitance of variable capacitance 132. When transistor 138 is deasserted, capacitors 134 and 136 will both contribute to the effective capacitance of adjustable circuitry 132. The capacitances of capacitors 134 and 136 may be selected such that coil 42 resonates when the transistor is either asserted or deasserted.

FIG. 12 shows another example, similar to FIG. 11, where fixed capacitors 134 and 136 are coupled in series between coil 42 and ground. In this example, however, transistor 138 is coupled between node 140 and node 142 (that is interposed between coil 42 and capacitor 134). Therefore, when transistor 138 is asserted, capacitor 134 will be bypassed and capacitor 136 will set the effective capacitance of variable capacitance 132. When transistor 138 is deasserted, capacitors 134 and 136 will both contribute to the effective capacitance of adjustable circuitry 132. The capacitances of capacitors 134 and 136 may be selected such that coil 42 resonates when the transistor is either asserted or deasserted.

Figure 13:
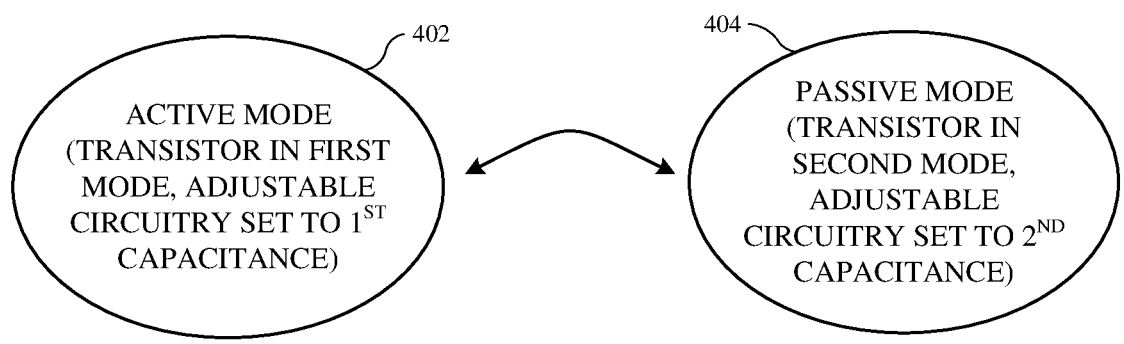
FIG. 13 is a state diagram showing illustrative operating modes for wireless power transmitting circuitry of the type shown in FIGS. 10-12 in accordance with an embodiment.

A state diagram showing illustrative operating modes for wireless power transmitting circuitry 52 of the type shown in FIGS. 10-12 is shown in FIG. 13. As shown, the wireless power transmitting circuitry may be operable in an active mode 402 (e.g., when the wireless power transmitting circuitry is used to transmit wireless power using coil 42). In active mode 402, the wireless power transmitting circuitry may set adjustable circuitry 132 to a first capacitance. Also in the active mode, the inverter 60 of the wireless power transmitting circuitry may be used to generate an AC signal at the inverter output terminal. The wireless power transmitting circuitry may also be operable in passive mode 404 (when the wireless power transmitting circuitry is not used to transmit wireless power using coil 42). In passive mode 404 (sometimes referred to as inactive mode), the wireless power transmitting circuitry may set adjustable circuitry 132 to a second capacitance that is different than the first capacitance. Also in the passive mode, the inverter 60 of the wireless power transmitting circuitry may be disabled. In the examples of FIGS. 11 and 12, transistor 138 may be in an opposite state in the active mode and the passive mode. For example, if transistor 138 is asserted in the active mode, transistor 138 is deasserted in the passive mode. If transistor 138 is deasserted in the active mode, transistor 138 is asserted in the passive mode.

The above embodiments referring to component 138 as a transistor are merely illustrative. In general, for any switch or transistor referred to herein, any desired component capable of electrically connecting/disconnecting two terminals may be used (e.g., a transistor, a mechanical switch, etc.).

The foregoing is merely illustrative and various modifications can be made to the described embodiments. The foregoing embodiments may be implemented individually or in any combination.

What is claimed is:

1. A wireless power transmitting device with a charging surface configured to receive a wireless power receiving device, the wireless power transmitting device comprising:

a plurality of coils configured to transmit wireless power signals;

a plurality of inverters each having an output terminal coupled to a corresponding coil in the plurality of coils, wherein each coil of the plurality of coils is coupled to respective adjustable circuitry having a variable capacitance coupled in series with the coil; and control circuitry configured to control the variable capacitance of the adjustable circuitry of each coil of the plurality of coils based on a determination indicative of whether the coil is in an active mode in which the inverter of the coil is enabled or a passive mode in which the inverter of the coil is disabled, wherein each coil of the plurality of coils is operable in the active mode and in the passive mode, and the control circuitry is configured to control a first coil in the active mode to transmit at least a portion of the wireless power signals while the control circuitry controls the variable capacitance of the adjustable circuitry of a second coil in the passive mode to reduce magnetic coupling into the second coil.

2. The wireless power transmitting device of claim 1, wherein the control circuitry is configured to control the variable capacitance of the adjustable circuitry for each coil of the plurality of coils in the active mode to be equal to a first capacitance.

3. The wireless power transmitting device of claim 2, wherein the control circuitry is configured to control the variable capacitance of the adjustable circuitry for each coil of the plurality of coils in the passive mode to be equal to a second capacitance that is different than the first capacitance.

4. The wireless power transmitting device of claim 1, wherein the control circuitry is configured to control the inverter of each coil of the plurality of coils in the active mode to generate an alternating current signal at the inverter output terminal.

5. The wireless power transmitting device of claim 4, wherein the control circuitry is configured to disable the inverter of each coil of the plurality of coils in the passive mode.

6. The wireless power transmitting device of claim 1, wherein the adjustable circuitry for each coil comprises:
first and second capacitors coupled in series between the coil and ground.

7. The wireless power transmitting device of claim 6, wherein the adjustable circuitry for each coil comprises:
a transistor that is coupled to a node that is interposed between the first and second capacitors.

8. The wireless power transmitting device of claim 7, wherein the transistor for each coil is coupled between the node and the ground.

9. The wireless power transmitting device of claim 7, wherein the transistor for each coil is coupled between the node and an additional node that is interposed between the first capacitor and the coil.

10. A wireless power transmitting device with a charging surface configured to receive a wireless power receiving device, the wireless power transmitting device comprising:
a plurality of coils configured to transmit wireless power signals;
a plurality of inverters each having an output terminal coupled to a corresponding coil in the plurality of coils, wherein each coil of the plurality of coils is coupled to respective adjustable circuitry comprising:
a capacitor coupled to the coil; and
a transistor coupled in series with the capacitor and the coil; and
control circuitry configured to control the transistor of each coil in a first portion of the plurality of coils to be in a first state while that coil in the first portion is in an active mode, and to control the transistor of each coil in a remaining portion of the plurality of coils to be in a second state while that coil in the remaining portion is in a passive mode.

11. The wireless power transmitting device of claim 10, wherein the control circuitry is configured to assert the transistor to couple the capacitor of the coil to ground in the first state.

12. The wireless power transmitting device of claim 10, wherein the control circuitry is configured to deassert the transistor to couple the capacitor to a floating node in the second state.

13. A wireless power transmitting device with a charging surface configured to receive a wireless power receiving device, the wireless power transmitting device comprising:
wireless power transmitting circuitry having a plurality of coils that are configured to transmit wireless power signals, a plurality of inverters each having an output terminal directly connected to a corresponding coil in the plurality of coils, and a plurality of adjustable circuits each having a terminal directly connected to the output terminal of a corresponding inverter in the plurality of inverters and each coupled in parallel with the corresponding coil in the plurality of coils; and
control circuitry configured to operate a given coil in the plurality of coils as an active coil to transmit the wireless power signals in a first mode in which the adjustable circuit for the given coil exhibits a first capacitance and to operate the given coil as a nominally passive coil in a second mode in which the adjustable circuit for the given coil exhibits a second capacitance to mitigate radiated emissions from the given coil.

14. The wireless power transmitting device of claim 13, wherein the control circuitry is configured to vary a capacitance of the adjustable circuit for the given coil according to a predetermined pattern that includes at least the second capacitance and a third capacitance.

15. The wireless power transmitting device of claim 14, wherein the control circuitry is configured to vary the capacitance of the adjustable circuit for the given coil according to the predetermined pattern while the given coil is in the second mode.

16. The wireless power transmitting device of claim 15, wherein the control circuitry is configured to disable the inverter for the given coil while the given coil is in the second mode.

17. The wireless power transmitting device of claim 13, wherein the adjustable circuit for the given coil comprises a first capacitor and a first switch coupled in series between the output terminal of the inverter for the given coil and ground.

18. The wireless power transmitting device of claim 17, wherein the adjustable circuit for the given coil comprises a second capacitor and a second switch coupled in series between the output terminal of the inverter for the given coil and the ground, a third capacitor and a third switch coupled in series between the output terminal of the inverter for the given coil and the ground, and a fourth capacitor and a fourth switch coupled in series between the output terminal of the inverter for the given coil and the ground and wherein the first capacitor and the first switch, the second capacitor and the second switch, the third capacitor and the third switch, and the fourth capacitor and the fourth switch are coupled in parallel between the output terminal of the inverter for the given coil and the ground.

19. The wireless power transmitting device of claim 13, wherein the adjustable circuit for the given coil comprises a first capacitor coupled between the output terminal of the inverter for the given coil and a first bias voltage supply line.

20. The wireless power transmitting device of claim 19, wherein the adjustable circuit for the given coil comprises a second capacitor coupled between the output terminal of the inverter for the given coil and a second bias voltage supply line, a third capacitor coupled between the output terminal of the inverter for the given coil and a third bias voltage supply line, and a fourth capacitor coupled between the output terminal of the inverter for the given coil and a fourth bias voltage supply line.

\* \* \* \* \*